Figure 1:
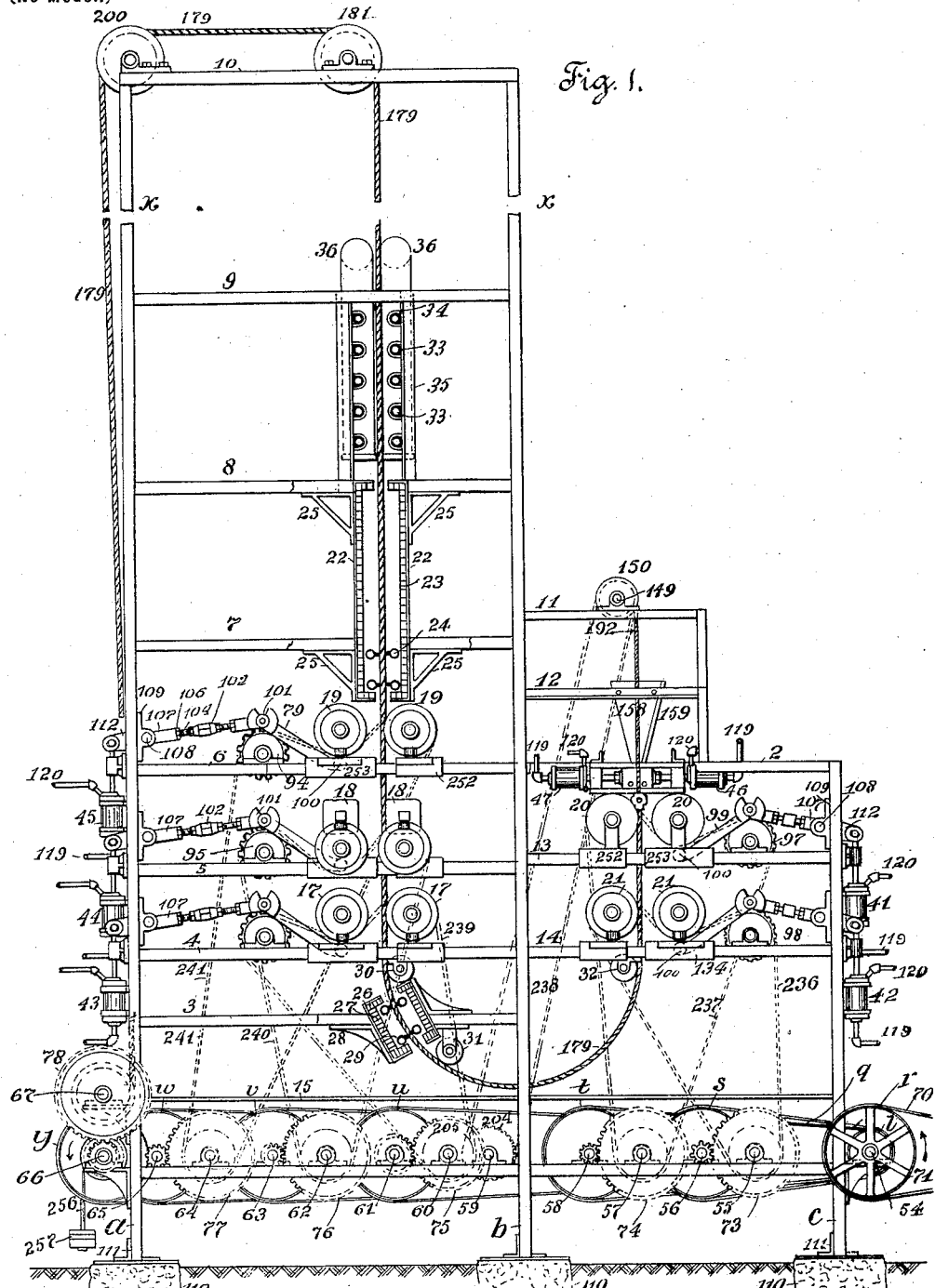

No. 711,287. Patented Oct. 14, 1902.
I. W. COLBURN.
GLASS WORKING MACHINE.
(Application filed Dec. 19, 1899.)

(No Model.) 7 Sheets—Sheet 1.

Witnesses,
W. R. Berry
M. T. Dixon

Inventor,
Irving W. Colburn
By his Attorney
Henry H. Bates

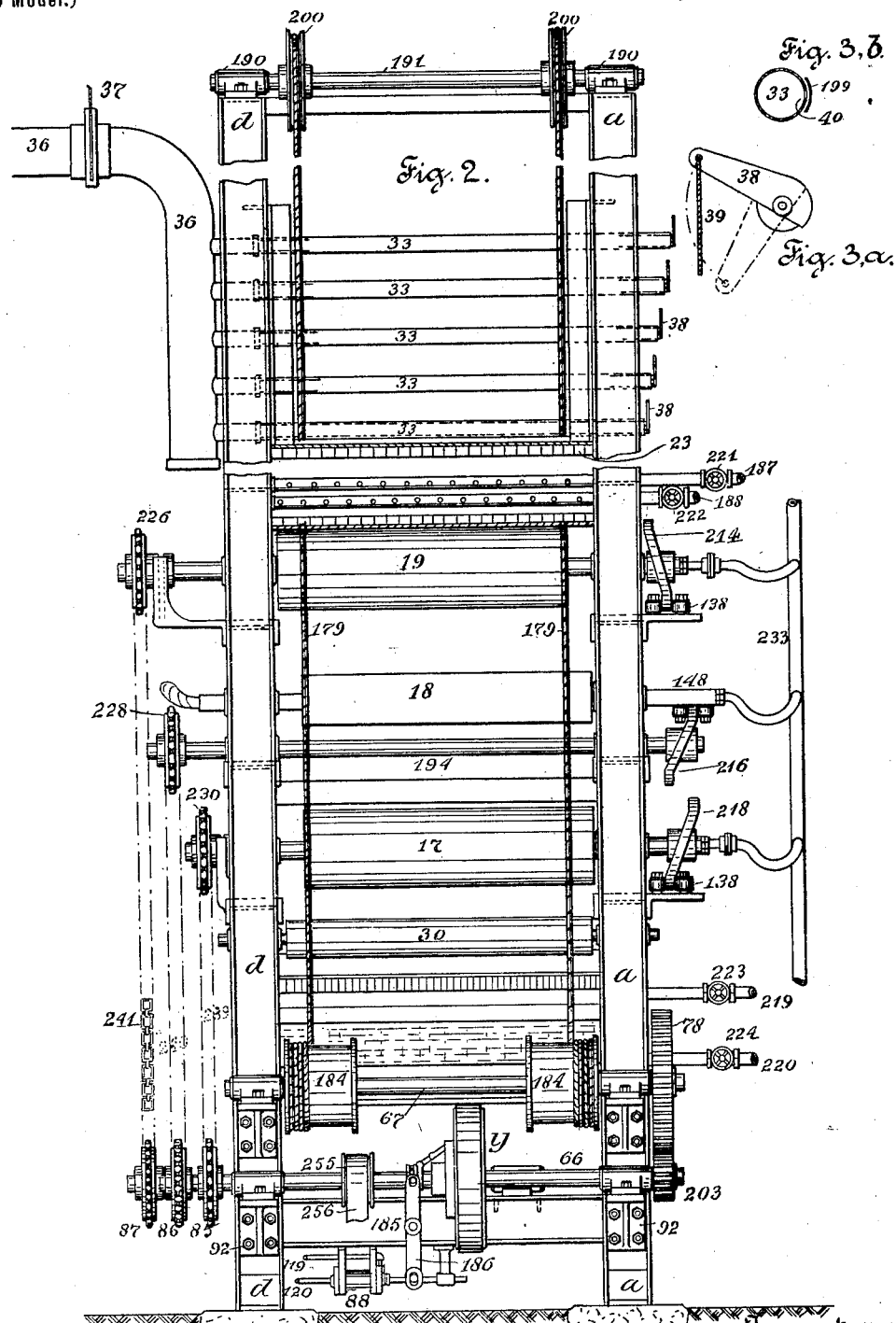

No. 711,287. Patented Oct. 14, 1902.
I. W. COLBURN.
GLASS WORKING MACHINE.
(Application filed Dec. 19, 1899.)
(No Model.) 7 Sheets—Sheet 3.

Witnesses,
W. R. Berry
M. J. Dixon

Inventor:
Irving W. Colburn.
By his Attorney
Henry H. Bates.

No. 711,287. Patented Oct. 14, 1902.
I. W. COLBURN.
GLASS WORKING MACHINE.
(Application filed Dec. 19, 1899.)
(No Model.) 7 Sheets—Sheet 4.
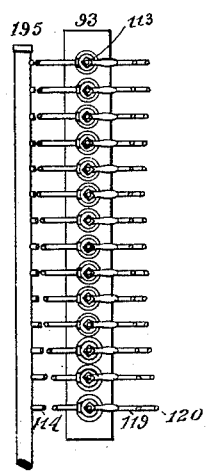
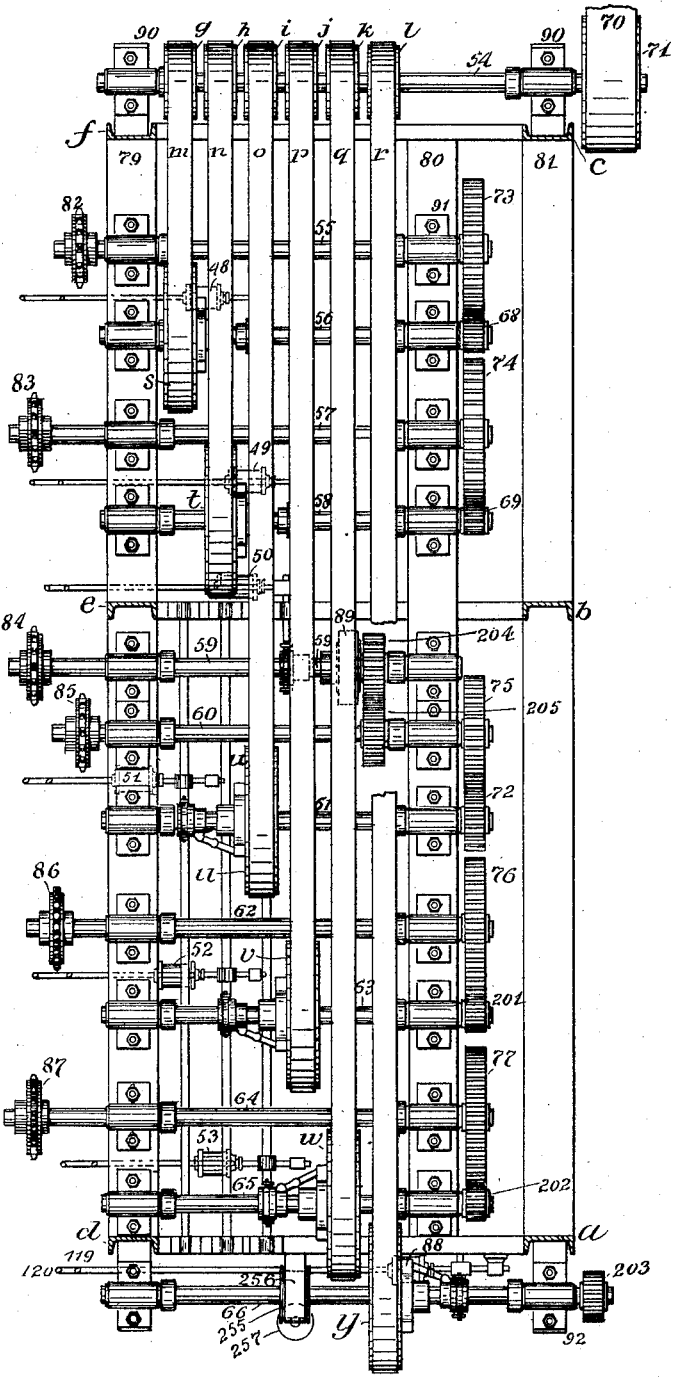
Witnesses: Inventor:
W. R. Berry Irving W. Colburn
M. J. Dixon By his Attorney Henry H. Bates No. 711,287. Patented Oct. 14, 1902.
I. W. COLBURN.
GLASS WORKING MACHINE.
(Application filed Dec. 19, 1899.)
(No Model.) 7 Sheets—Sheet 5.

Witnesses,
W. R. Berry.
M. J. Dixon.

Inventor:
Irving W. Colburn
By his Attorney
Henry H. Bates.

No. 711,287. Patented Oct. 14, 1902.
I. W. COLBURN.
GLASS WORKING MACHINE.
(Application filed Dec. 19, 1899.)
(No Model.) 7 Sheets—Sheet 6.
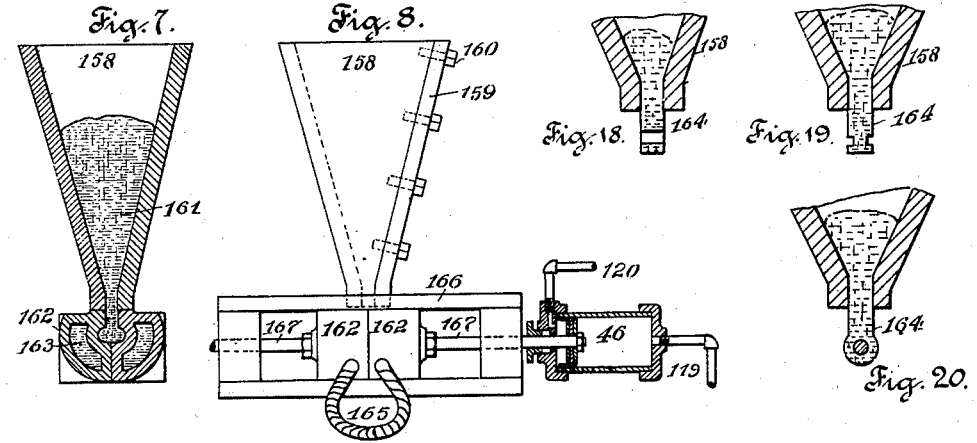
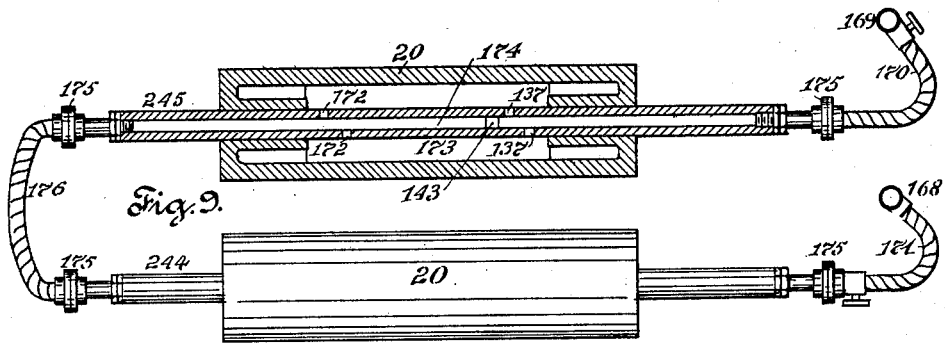
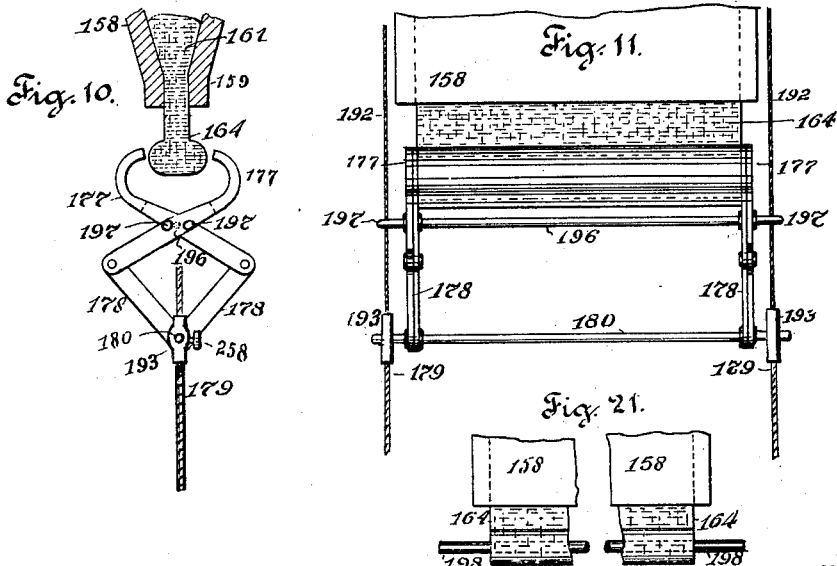
Witnesses:
W. R. Berry
M. J. Dixon
Inventor:
Irving W. Colburn
By his Attorney
Henry H. Bates No. 711,287. Patented Oct. 14, 1902.
I. W. COLBURN.
GLASS WORKING MACHINE.
(Application filed Dec. 19, 1899.)
(No Model.) 7 Sheets—Sheet 7.
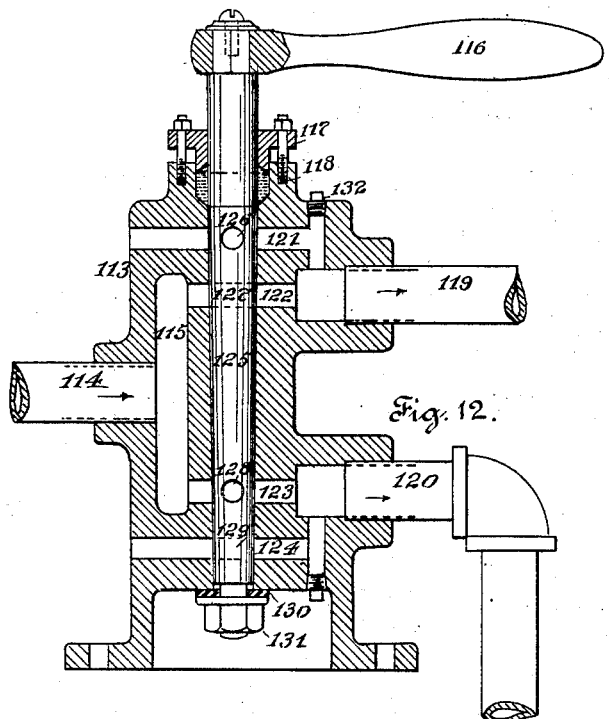
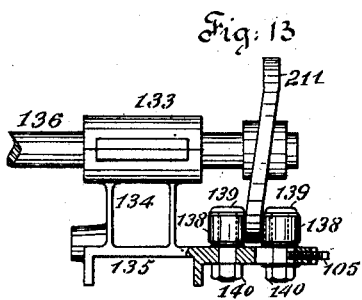
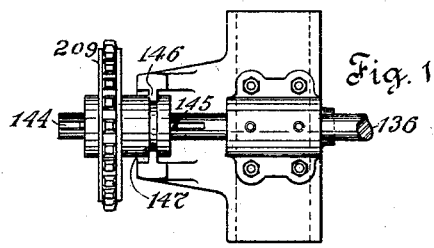
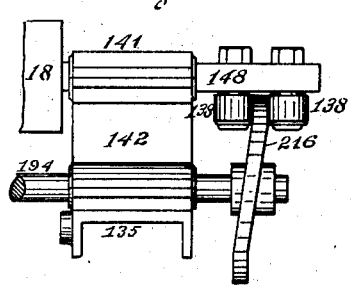
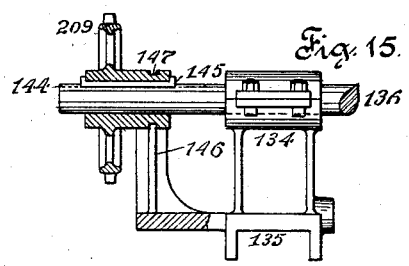
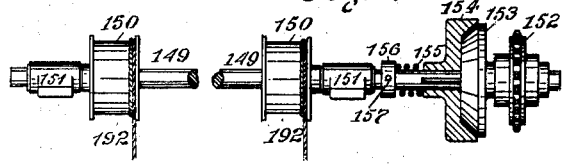

UNITED STATES PATENT OFFICE.

IRVING W. COLBURN, OF PHILADELPHIA, PENNSYLVANIA.

GLASS-WORKING MACHINE.

SPECIFICATION forming part of Letters Patent No. 711,287, dated October 14, 1902.

Application filed December 19, 1899. Serial No. 740,902. (No model.)

*To all whom it may concern:*

Be it known that I, IRVING W. COLBURN, a citizen of the United States, residing at Philadelphia, in the county of Philadelphia and State of Pennsylvania, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for rolling, pressing, stretching, reheating, and fire-finishing plastic glass into sheets for the purpose of manufacturing plate-glass and window-glass.

It comprises in one combined apparatus a means for cooling the initial portion of the plastic-glass blank and at the same time forming it into a means for attachment to the traction device by which the plastic sheet under process of formation is drawn along as it undergoes the several manipulative operations necessary to reduce it to a finished sheet; means for rolling and compressing the plastic sheet; means for simultaneously rolling, stretching, and polishing the plastic sheet; means for reheating the plastic sheet between different operations; means for surface-polishing of the plastic sheet; means for rolling and simultaneously polishing; means for final stretching and for fire-finishing to give a brilliant polish to the surface, and means for finally cooling and setting the finished sheet prior to its removal from the machine to be cut up into commercial sizes for use, all as hereinafter described and set forth.

The several mechanisms in the combined apparatus for producing the finished product are all driven from one prime source of motion through a series of shafting and gears located in the base of the machine. These furnish rotary movements and the traction agency. The manipulative movements are all accomplished by pneumatic agency, controlled by means of series of valves and piping under hand manipulation, making a machine exceedingly compact and occupying but little space when the multiplicity of operations effected by it are considered and also exceedingly economical of skilled labor.

Figure 4:
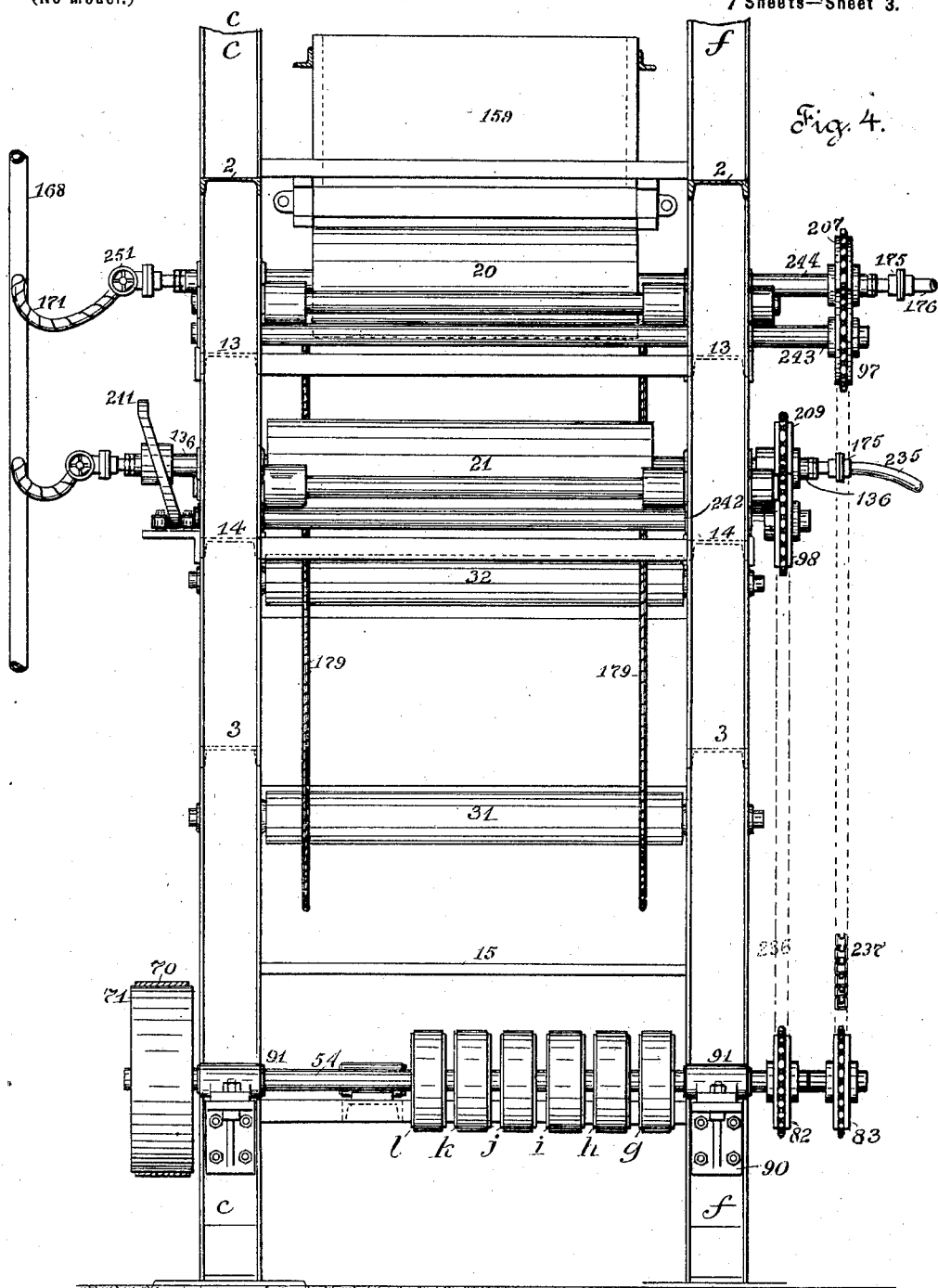
Figure 6:
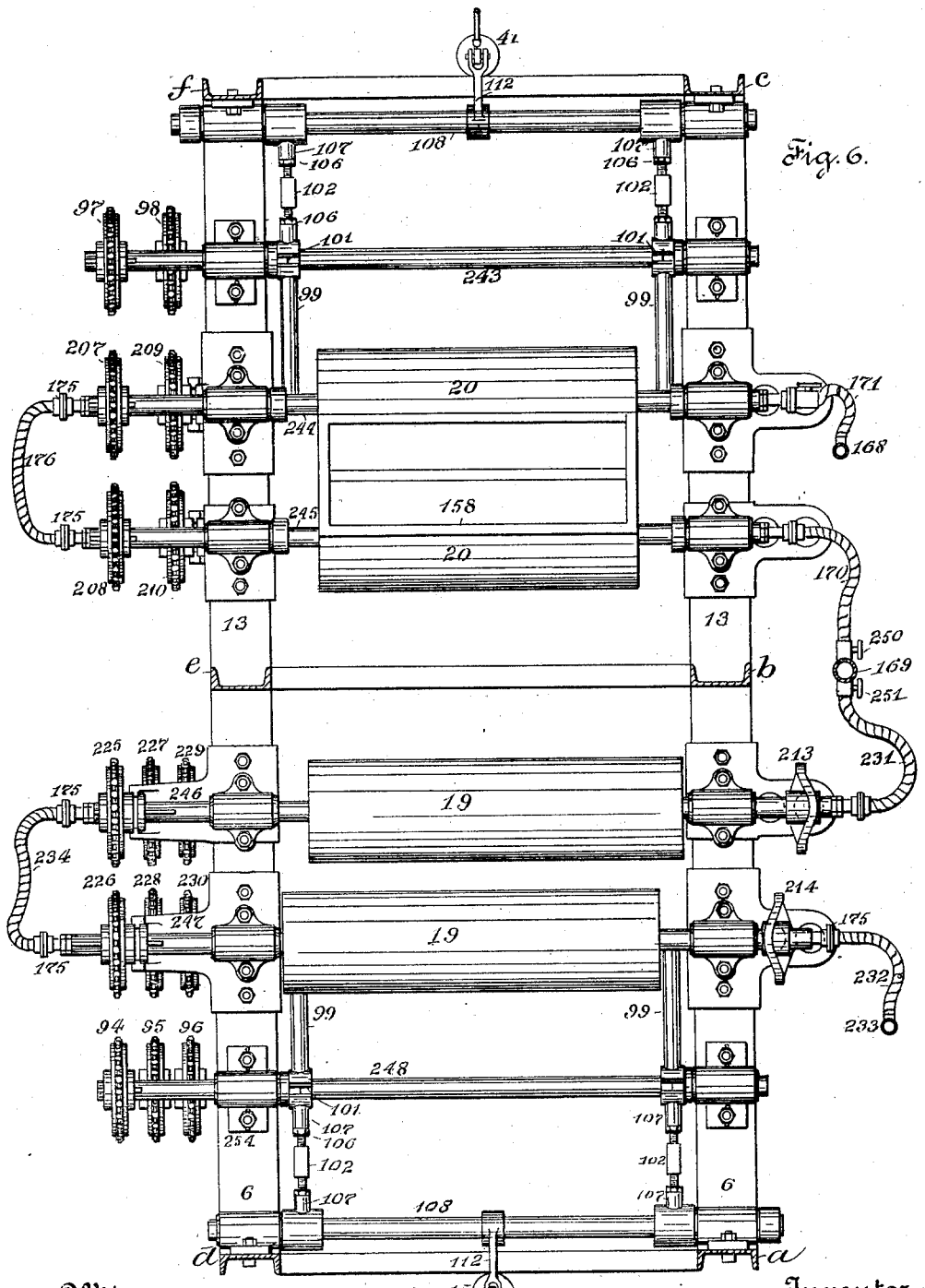

In the drawings forming a part of this specification, Figure 1 is a side elevation of the machine, practically in section, showing the main frame, driving mechanism, glass-hopper, reciprocating rolls and planes, reheater, fire-finisher, air-cooler, traction device, and pneumatic apparatus. Fig. 2 is a rear elevation showing the frame construction, the traction means, reciprocating means, water-supply, gas-supply, driving means, clutch mechanism, air-cooling means, &c. Figs. $3^a$ and $3^b$ show the details of the air-controlling means for the blast which supplies the air-cooling apparatus. Fig. 4 is a front elevation, partial view, showing the frame, the main driving-shaft and belt-pulleys on same, sprocket-gearing for a portion of the rolls, water-supply for the rolls, reciprocating mechanism for lower front rolls, the glass-hopper, &c. Fig. 5 is a plan view of the base of the machine, showing the main driving-shaft, the several power-shafts and gearing, belt-gearing from main shaft, sprocket-gears, air-clutches, and the switchboard containing the series of air-valves by which the pneumatic control of the different operative mechanisms is effected. This switchboard may be located in any convenient place in proximity to the machine, as the connections are through air-pipes, and it is therefore shown detached. Fig. 6 is a plan of a portion of the machine as viewed on a plane below the fire-finishing chamber looking from the rear, showing the sprocket gears and shafting for driving the two upper pairs of rolls and their idlers, the reciprocating means, the water-supply, the glass-hopper, &c. Fig. 7 is a transverse section of the glass-hopper, showing the bottom mold in closed position. Fig. 8 is an end view of the same hopper, showing the removable side and details of the press-mold-operating mechanism. Fig. 9 is a view of a pair of rolls 20 from beneath, one of them in section, for the purpose of showing its internal structure in connection with its means of water-supply. Fig. 10 is a transverse section of the lower end of the hopper with a portion of glass protruding therefrom formed, pressed, and chilled for attachment to the clamp and detail of the clamp. Fig. 11 is a front view of the same portion of the glass-hopper with protruding chilled portion of glass, the clamp in place with its operating mechanism, and the traction-cords and means by which the clamp is drawn to its place. Fig. 12, Sheet 7, is a vertical section of the two-way valve employed for controlling the air-supply to and from the various pneumatic cylinders which operate the various mechanisms of the machine. Fig. 13 is a detail view of the cam mechanism which operates the reciprocation of the rolls. Fig. 14 is a plan view of one of the bearings for a roll-shaft, showing how the driving-sprocket is held in its proper vertical plane while the roll is reciprocated during its rotation. Fig. 15 is a side view, partly in section, of the same shaft and bearing and sprocket-gear. Fig. 16 is a side view from the rear of the machine, showing the details of the mechanism for reciprocating the smoothing-planes. Fig. 17 is a side view, partly in section, of the shaft, winding-drums, clutch mechanism, and driving-gear for reversing the motion of the traction-cords and drawing the same, with the clamping mechanism, into position for attachment to the plastic-glass terminal. (See Figs. 10 and 11.) This device is shown in end view in Fig. 1. Fig. 18, Sheet 6, is a transverse vertical section of the lower portion of the glass-hopper with molded plastic glass protruding, showing a detail of another form for molding the chilled end for attachment of the traction-clamp. Fig. 19 and Fig. 20 are detail views of still other alternative forms. Fig. 21 is a side view, broken in the center, of the form of glass-terminal illustrated in Fig. 20. Fig. 22, Sheet 4, is a detail view of the adjustable bearing for the idler-shafts of idler-sprockets 94 95 96 97 98, Sheet 5.

Referring to the drawings, the entire mechanism is supported on a metal framework consisting of four lofty columns $a\ b\ d\ e$, which may be channel-beams or I-beams, and two of less height, $c\ f$. These are connected together at suitable intervals by cross-beams 3 4 5 6 7 8 9 10 11 12 13 14, which in addition to their function of binding together and supporting the uprights sustain the several mechanisms of the apparatus and the means of operating them. The present machine is based upon suitable foundation-piers 110 and strongly braced. As the machine is of considerable altitude, in practice the cross-beams are shown closer together than the due proportion would warrant, and some are omitted, the frame being broken at $x\ x$, Fig. 1. Some parts of the apparatus also are shown more condensed than in actual practice, as the fire-finishing chamber and the air-cooling device.

Beginning with the base of the machine, 54 is a main power-shaft sustained in suitable bearings 90 at the front of the machine, on which is mounted the pulley 71, receiving rotary motion from any suitable prime motor by means of the belt 70. On this shaft 54 are mounted the six driving-pulleys $g\ h\ i\ j\ k\ l$, which by means of belts $m\ n\ o\ p\ q\ r$ communicate rotary motion to the several power-shafts 56, 58, 61, 63, 65, and 66, respectively, through the several clutches $s\ t\ u\ v\ w\ y$, respectively, which clutches are operated from the pneumatic switchboard 93, Fig. 5, through the respective air-cylinders 48, 49, 51, 52, 53, and 88. 50 is an air-cylinder, operating in a similar manner a clutch 89 for the purpose of bringing into operation when desired a shaft 59, geared to and deriving motion from shaft 61. From said clutch-shafts 56 58 61 63 65 the several shafts 55 57 60 62 64 also derive their motion, being geared thereto by gear wheels and pinions 73 68 74 69 75 72 76 201 77 202, respectively. The function of shaft 55 is to drive sprocket-gear 82, fixed on its left-hand end. Shaft 57 drives sprocket-gear 83, shaft 59 drives sprocket-gear 84, shaft 60 drives sprocket-gear 85, shaft 62 drives sprocket-gear 86, shaft 64 drives sprocket-gear 87, and shaft 66, which is geared to shaft 67 by gears 203 78, drives the winding-drums 184, Fig. 2. The sprocket-gear 82 is geared by belt 236 to sprocket-gears 209 210, Fig. 6, passing over idler-sprocket pulley 98 on shaft 242. The sprocket-gear 83 is geared by belt 237 to sprocket-gears 207 208, Fig. 6, on shafts 244 245, passing over idler-sprocket pulley 97 on shaft 243. Said sprocket-gears 207 208 and 209 210 drive the first and second pairs of rolls 20 and 21, respectively. The sprocket-gear 84 is geared by belt 238 to sprocket-gear 152, Fig. 17, on shaft 149, which drives the lifting-drums 150, Fig. 1. The sprocket-gear 85 is geared by belt 239 to sprocket-gears 229 230, Fig. 6, which drive the third pair of rolls 17 17, passing over idler-sprocket pulley 96. The sprocket-gear 86 is geared by belt 240 to sprocket-gears 227 228, which operate the smoothing-planes 18 18, passing over idler-sprocket pulley 95. The sprocket-gear 87 is geared by belt 241 to sprocket-gears 225 226 on shafts 246 247, passing over idler-sprocket pulley 94 on shaft 248. This belt drives the fourth pair of rolls 19 19.

Secured to cross-beams 12 is the hopper or receptacle 158 for molten or plastic glass, Figs. 1, 6, 7, 8. Its front side is removable, as shown in Fig. 8, being held by bolts 160, which can be taken out, or in any other convenient manner. This hopper is formed to coöperate with a device placed at its outlet, Fig. 7, for molding and chilling a terminal on the plastic sheet, hereinafter described. Immediately beneath the hopper and in alinement with its outlet is located the first pair of rolls 20 20. These rolls are hollow and are supplied with a water circulation for cooling purposes by means of stand-pipes 169 168, connecting-tubes 170 171, revoluble couplers 249 175, connecting-tube 176, and suitable valves 250 on the pipes for regulating and controlling the flow of water. The connecting-pipes are made flexible for the purpose of permitting the movement of one of the rolls, later described, without disconnecting the water circulation. Similar pipes and valves supply all the several pairs of rolls in a similar manner. The mode of supplying the water to the rolls is illustrated in detail in Fig. 9, where one of the rolls is shown in section. Said roll is fast on the hollow shaft 245, in which tube there is an obstruction 143. The tube is, however, perforated on each side of the obstruction at 137 and 172, so that the cooling fluid flows into the hollow space 173 through the holes 137 and out of the same back into the tube through holes 172, thence out through the flexible tubing 176 to the other roll of the pair, where similar circulation takes place, and thence out through the flexible tube connection 171 and exit-pipe 168. This description of the water circulation will serve for all the rolls. The planes 18 18 are also supplied with a water circulation similarly. One of the rolls 20 is made fast by its pedestal 252 upon its supporting-beam 13, with its circumference in vertical alinement with the edge of the mouth of the hopper above, while the other roll at the left hand in Fig. 1 is made to slide to and fro on the beam 13, so as to vary the width of the space between the said rolls and enable the operator to compress the plastic sheet by means about to be described. The base of the roll-bearing seated on the beam 13 is found to embrace the beam while permitting longitudinal motion thereon similarly to the seat 135, (shown in Fig. 15,) the beams being machined to afford suitable sliding ways for the purpose at both ends of the roll.

On the uprights c f, in suitable bearings 109, is located a rock-shaft 108, Fig. 6. To this shaft are attached two lever-arms 107 107, leading to knuckle-joints 101. Between the two extreme ends of this lever 107 is interposed a turnbuckle extension device 102, with lock-nuts 106 for giving a fine adjustment to the length of the lever, and thus regulating the degree of compression of the plastic glass. On the other side of the knuckle-joints are the counterpart levers 99, which are pivoted to the movable pedestal 253 of the roll at 100. The knuckle-joint is of the rule-joint construction, so as to be stopped from further motion when it reaches the position of greatest extension of the levers 107 99, which occurs when said levers form a straight line. In this position the rolls give the maximum compression to the plastic-glass sheet and the minimum of thickness thereto. To operate this jointed lever, there is an extension-arm 112, projecting from the other side of the shaft 108, beneath which the air-cylinder 41 and piston are located, the piston-rod making connection with said lever-arm by an elongated aperture or equivalent means to admit of parallel motion in the piston-rod. As the approximation and separation of rolls 21 21, 17 17, and 19 19, as well as of the pressure planes 18 18, is effected by similar means to that above described, one description will suffice for all. In addition to this movement of approximation and separation the second pair of rolls 21 21 has a lateral reciprocating movement, which will now be described. This said movement is for the purpose of polishing the sheet of plastic glass while under compression during its passage. It is effected as follows: On shaft 136 of each of the rolls 21 is fixed or keyed an inclined rotary cam, Figs. 4, 14, whose edge rotates between two antifriction guide-rolls 138 138, adjustably secured by studs 139, nuts 140, and an adjusting-screw 105 or in any other suitable manner to a fixed portion of the framework or an attachment thereto. There is a slotted way in the base for the attachment of one of the studs to permit of the action of the adjusting - screw. The effect of this inclined cam during its rotation, with its edge confined at one point of the path, is to give a longitudinally-reciprocating movement to the roll-shaft and roll, which thus makes one complete double oscillation for each revolution. The cams are so set on the shaft that the oscillation shall be opposite and not coincident, as shown by the rolls 19 19 and their cams, Fig. 6. To prevent the driving-sprocket from being displaced by this to-and-fro movement, the device shown in Figs. 14 and 15 is employed. The sprocket instead of being fast on the shaft is loose thereon. There is a longitudinal keyway 144 in the shaft, in which a key 145, fitting a corresponding groove in the sprocket-wheel, plays, or the connection may be a simple ordinary spline and groove, of which the above is the equivalent. The sprocket-wheel itself is held from displacement by means of an annular groove 147 in engagement with an annular ridge 146, which permits of the free revolution of the wheel, while preventing its lateral movement. The sprocket - wheel thus freely revolves and drives the shaft and roll by means of the spline, while the shaft has free longitudinal reciprocatory play, as controlled by the cam 211. The same reciprocatory movement is given to the third and fourth pairs of rolls 17 17 and 19 19 by similar means, so that the above description will suffice for them. Rolls 17 17 are mounted on beam 4 and rolls 19 19 on beam 6. Between said pair of rolls above mentioned is located, on beam 5, a pair of polishing planes or pressure-bars 18 18, the function of which is to smooth and polish the passing sheet of glass between consecutive rolling and compressing operations, but to polish by frictional agency merely, as there is no rolling pressure. These polishing-bars are polygonal in cross-section, preferably four-sided, as shown in Fig. 1, and are mounted on non-rotary shafts 148, Figs. 2, 16, which may be either polygonal, held in polygonal bearings, or furnished with a spline and keyway to prevent rotation, like the roll-shafts heretofore described. These pressure-bars are preferably hollow and when hollow are supplied with a cooling-fluid circulation precisely similar to that supplied to the rolls. The said planes are given a reciprocating motion by means quite similar to those employed to reciprocate the rolls above and beneath them. Such means is illustrated in the detail view, Fig. 16, where 142 is the plane pedestal, 141 the bearing, 18 the plane, 148 the non-rotary shaft, 138 the antifriction guide-rolls, 194 the cam-shaft, and 216 the rotatory cam. On the other end of the cam-shaft is mounted the sprocket-gear 228, Fig. 2, whose rotary motion imparts through the cam a reciprocating movement to the plane precisely similar to that imparted to rolls 17, 19, 21, a similar and opposite reciprocating movement being at the same time imparted to its companion plane by similar means.

On beams 3 is located in a fixed position the reheater 26. This is a metal box, open at each end, firmly held on the beams 3 by brackets 28, lined throughout with the refractory lining 27, of fire-brick or other suitable fire-resisting material. Within this refractory chamber is arranged a series of perforated gas-pipes 29 or other suitable source of heat, with some pipes for supplying air for combustion purposes interspersed. The gas or equivalent fuel is supplied from a convenient outside source by pipes 220. Air may be supplied through pipe 219. These pipes are furnished with suitable valves to control and regulate the supply. Beneath the reheater is located a non-conductive diaphragm 15 to protect the machinery in the base from the effects of heat radiation.

On beams 14, 3, and 4 are respectively located the guide-rollers 32, 31, and 30, the object of which is to guide the plastic sheet in its transit from rolls 21 to the reheater and to rolls 17.

Above the last pair of rolls 19 is located the fire finishing-chamber 22. This is a long narrow box or housing vertically placed over the last pair of rolls and supported on beams 7 and 8 by bracket-supports 25 or other suitable means. It consists of a metal shell lined interiorly throughout with fire-brick or other suitable fire-resisting material 237, open at top and bottom for the passage of the glass sheet. In the lower portion of the chamber is located a series of perforated gas-pipes 24 or equivalent heating means interspersed with pipes for supplying air for combustion, the same as for the reheater. The fuel and air supply is derived from any convenient outside source through pipes 187 188, having suitable means for regulating and controlling the supply in valves 221 222.

Directly above the fire finishing-chamber is located the air-cooling apparatus. This consists of certain uprights 35, to which are secured on each side of the path of the sheet of glass a series of air-blast tubes 33, perforated or slitted on the inner sides, facing the glass, with wind-apertures. These tubes derive air from a larger wind main or duct 36, supplied from an external source of air under pressure by suitable fans, blowers, or other air-forcing devices. An air-gate 37 is located in the main duct to regulate or cut off the blast at will. In conjunction with the air-tubes 33 is the device illustrated in Figs. 3$^a$ and 3$^b$. This is a curved shield 199, pivoted concentrically upon each of the tubes 33, so as to cover all the apertures 40 at will, and provided with a lever 38 and cord 39, by which the shield can be manipulated. The weight of the metallic shield is sufficient to hold it in place over the apertures and to return the same to place except when manipulated by the cord. By this means the blast can be instantly applied and as suddenly withdrawn on each tube 33 separately or as many as may be necessary, in accordance with the needs of the glass under treatment.

Directly over the air-cooling apparatus and in alinement with its central passage are located a pair of pulleys 181, one of which appears in Fig. 1, the purpose of which is to sustain the traction cords, ropes, or chains 179. These cords also extend horizontally and pass over the pair of pulleys 200, (shown in Fig. 2,) and thence downward to the winding-drums 184 184 on shaft 67, Fig. 2, which shaft is connected by gears 78 203 to clutch-shaft 66, carrying clutch $y$, under the control of air-cylinder 88, by which means the traction device is at all times under complete control of the operator at the switchboard. On shaft 66 is a friction-pulley 255, upon which rests a friction strap or band 256, attached to the frame of the machine at one end and weighted at the other by weight or weights 257. This is to give a frictional resistance to the drum-shaft.

Directly over hopper 158, Fig. 1, on beam 11 is located the winding-shaft 149, carrying drums 150 150, Fig. 17, heretofore briefly alluded to. This shaft is supported in suitable bearings 151 and has on it a self-acting friction-clutch 153 154, the degree of friction being governed by the spiral spring 155, pressing against clutch member 154 and regulated as to degree of tension by the adjustable washer 156 and set-screw 157. The clutch member 154 is splined on the shaft 149, so as to be capable of longitudinal motion thereon, but is compelled by the spline to rotate with the shaft. The clutch member 153 is loose on the shaft, but collared thereon, so as to be fixed in position against the thrust of spring 155 and clutch member 154. Said clutch member derives rotary motion from sprocket-gear 152, belted, as heretofore stated, to power-gear 84 on shaft 59. It results that shaft 149 is driven by said gears through medium of friction of the clutch members; but an undue tension on traction-cords 192 192, winding on drums 150 150, will cause the clutch members to slip on each other, and thus save the breakage of the traction-cords. The utility of this will be hereinafter apparent. The traction-cords on drums 150 are a continuation of the main traction-cords 179 winding on drums 184. The drums 150 draw the cords one way preparatory to operation, while the main traction-cords operate in the opposite direction to draw the plastic sheet through the different mechanisms and stretch the same. The traction-cords are long enough in both cases to reach the limit of operation in winding and unwinding. At the juncture of the two sets of cords is a device 193 for attachment to the clamping device 177, Figs. 10 and 11, by which connection is made with the chilled terminal on the plastic sheet to pull the same from the hopper in a continuous stream. This device 193 is shown in its simplest form in Figs. 10 and 11. It is a simple metallic eye or pair of eyes, to which the traction-cords are attached on both sides, formed for engagement with the rod 180, which constitutes a part of the clamping device, and furnished with clamp-screws 258. Various forms of this clamping device may be employed. The one illustrated here is of the simplest construction. It consists of two pairs of crossed grippers 177, pivoted in a rod 196 and connected by links 178 to the rod 180, forming connection with the traction-cords. By this means the clamp automatically clings to the glass-terminal with a tenacity proportioned to the strain extended thereon.

197 197 are guide-pins on the clamping-tongs, between which the traction-cords pass.

Pivoted rod 196 is riveted in or welded to the outer member of each pair of crossed grippers, and would not appear in the end view, Fig. 10, in place of which the guide-pins 197 appear.

The mode of forming the chilled terminal 164 of the plastic glass sheet in its incipiency now remains to be described in detail. This terminal may be of various forms and kinds, several of which are illustrated in Figs. 10, 18, 19, 20, and 21. Its form is not material, so that it is essentially adapted to be formed on the plastic glass and then firmly grasped by the clasping device borne on the traction-cords, so as to enable plastic glass to be continuously drawn from its receptacle through and past the several means for rolling, compressing, stretching, reheating, polishing, finishing, and cooling and setting the manufactured sheet, which is of a very considerable length, only limited by the height of the machine and the capacity of the apparatus. The device for forming the terminal in its simplest form is illustrated in Figs. 7 and 8. At the bottom of the hopper is a pair of movable mold-sections 162 162, with cavities 163 for a circulation of cooling fluid supplied in the same manner as that for the rolls, with an inlet and outlet to the mains and flexible connection 165. These mold-sections slide to and fro beneath the hopper-outlet in ways 166 and are actuated and controlled by pneumatic cylinders and pistons 46 47, operated from the switchboard in the same manner as the rolls and planes, one of which air-cylinders is shown in section in Fig. 8. The form of terminal desired is embodied in reverse in the mold. It may be a flanged enlargement, as shown in section in Fig. 10, or it may have perforations, as shown in Fig. 18, or it may have grooved depressions, as shown in Fig. 19, or a rod may be inserted in the mold for the glass to surround, as shown in Figs. 20 and 21. In each case the clamp-fingers will be formed and adapted to grasp the chilled seal or when an adjunct like a rod 198 is employed to grasp said rod or other adjunct. In the manufacture of sheet-glass this means of traction is essential, because the rolls alone have not sufficient power and grasp upon the plastic glass to move, draw, and stretch the same through all the different manipulations to which it is subjected in the process of manufacture.

The pneumatic means for operating the various mechanisms is of simple character. The air-cylinder 41 for operating the aperture of rolls 20 has already been described. Similar air cylinders and pistons are connected with the mechanism of rolls 21 17 19 and planes 18—viz., cylinders 42, 43, 45, and 44, respectively. These air-cylinders are supplied with air under suitable pressure from an external source of supply through pipes 119 120, leading to the advance and return sides of the pistons, respectively, in each case through a series of valves 113, arranged in order on the pneumatic switchboard 93, Fig. 5, controlled by hand-operated levers 116, one valve for each mechanism, or fourteen in all, in the machine herein illustrated. A detail view of a valve adapted for the purpose is shown in Fig. 12, where 114 is the air-inlet from the main pipe 195, leading from the external source of supply, which may be a compressor of any of the well-known types. This air is under much higher pressure than that furnished to the cooling apparatus, which is more preferably generated by a blast-fan at less expense.

115 is the air-chamber.

122 123 are air-passages to conduit-pipes 119 120, respectively, and 121 124 are passages to the external air from said pipes, respectively; 125, an upright valve-stem slightly tapered, having pierced transversely through it four apertures 126 127 128 129, two—viz., 126 and 128—being at right angles to the other two, 127 and 129. It follows that when the lever-handle is in the position shown in Fig. 12 air can freely pass through passage 122 and aperture 127 to the operative or forming side of the piston, or vice versa, while air is being freely discharged from the opposite side of the piston through pipe 120, passage 124, and aperture 129 to the open air. When the lever 116 is given a quarter-turn, the reverse action takes place, air is sent through passage 123 and aperture 128 to pipe 120 and thence to the withdrawing side of the piston, while air is freely discharged from the opposite side of the piston through passage 121 and aperture 126 to the open air. The same description applies to the operation of all the air valves, cylinders, and pistons in the entire machine and will do for all. Hence for simplicity the same numerals of reference are used for all. The screw-plugs 132 are simply mechanical expedients to facilitate construction. 130 is an elastic washer constrained by nut 131 to regulate the working friction of stem 125.

Operation: As represented in the drawings, the machine has just had delivered to the hopper a charge of molten or plastic glass, brought to it from the furnace in melting-pots by means of specially-arranged traveling cranes. The hopper may, however, be supplied in any practical manner, as by ladling, if the melting-tank is in close proximity to the machine. The plastic glass will protrude from the slit in the bottom in the manner illustrated in Fig. 7, filling the chill-mold, which is closed for the purpose. The terminal thus assumes any desired form given to it by the configuration of the mold, and the cooling circulation of the mold soon chills and sets the glass, leaving it of the form shown in Fig. 10 if the mold of Fig. 7 is the one employed. When chilled so as to be permanent, the mold is opened by means of the pneumatic apparatus 46 47 and the air-valve on the switchboard. The main power-shaft is now set in operation. The winding-shaft 149 and drums 150 are started by means of clutch 89 and air-cylinder 50, thus drawing on the traction-cords 192 and bringing the clamping device, which had been attached to the traction-cords after the preceding clamp and working of glass had been removed from the machine, down through and past the various mechanisms up into juxtaposition with the chilled terminal and into engagement with it, when the clamp automatically grasps the terminal by reason of the weight of the cables and the action of links 178. If the cables 192 have been overdrawn from any cause, the yielding of spring-clutch 154 will prevent danger, and the shaft 146 will cease its rotation, as it receives its rotary motion from the clutch 154 solely. The clutch 89 is now released, and the traction-drums 184 are started by means of clutch $y$, heretofore in open position, but now closed, as seen in Fig. 2, by means of the pneumatic cylinder 88 and its appropriate valve on the switchboard. This action of the clutch brings shaft 66 into operation and through it shaft 67, on which are the winding-drums 184. The action of these drums commences to draw on the traction-cables, causing cables 192 to unwind on their drums against the friction of clutch 153 154, and simultaneously the rolls 20 are started into rotation by operating the pneumatic cylinder 49 through its appropriate valve, which cylinder throws the clutch $t$ into connection and causes shafts 57 58 to rotate and sprocket-gear 83 and belt 237 to revolve. As soon as the plastic glass enters between the rolls the air-cylinder 41 is brought into operation, powerfully compressing the plastic sheet as it is drawn between the rolls and bringing it to the proper thickness for encountering the second pair of rolls 21. As the glass enters between this pair of rolls the compressing apparatus is brought into operation by means of the pneumatic cylinder 42 the same as in the case of the first pair, the said rolls having, by means of pneumatic cylinder 48, been previously started into rotation through the operation of clutch $s$, bringing shafts 56 and 55 into operation, and sprocket-gears 209 210 on the roll-shafts, Fig. 6. These rolls have a reciprocatory rubbing action in addition to the compressing action caused by the actions of the cams on their respective shafts, one of which, 211, is shown in Fig. 24. The plastic sheet thus gets both the compressing and the polishing treatment as it passes this pair of rolls and proceeds on its way past the guide-rolls 32 and 31 to the reheater 26. This reheater is only required when thin sheets are operated upon, which lose their heat rapidly. Thick glass sheets require no reheating and may even require cooling, in which case a cooling apparatus is substituted for the reheater; but this forms no part of the present invention. The flame of the reheater can be ignited at a moment's notice. After passing the reheater and guide-roll 30 the plastic sheet comes between the third pair of rolls 17. Here it is subjected to both the compressing and the rubbing action by means similar to that described for rolls 21. It next encounters the polishing-planes 18, where it is subjected to simple reciprocatory frictional treatment in the manner heretofore described. The plastic sheet next comes between the fourth pair of rolls 19, where it undergoes a similar treatment to that experienced with rolls 21 and 17. The third and fourth pairs of rolls, as well as the pressure-bars, are preferably paste-covered. The glass sheet at this stage has been worked to the desired thickness and has a fine, smooth, and highly-polished surface. These three sets of rolls do not in practice revolve at the same speed. The rolls of the second pair 21 preferably revolve somewhat faster than those of the first pair 20, thus imparting a slight stretching action to the glass between said rolls. The third pair of rolls 17 runs at the same speed as the second pair, as the glass should not be stretched in the loop nor in the reheater. The fourth pair of rolls 19 runs relatively slower and may even run in the reverse direction by a different arrangement of belting, the object of the differential movement being to better polish and rub the glass and also to stretch it above the fourth pair rather than between the third and fourth pairs of rolls. The difference in circumferential velocity is relative and may be accomplished by running the fourth pair of rolls in either direction. The difference in circumferential velocity is provided for by a small difference in the number of sprocket-teeth on the respective driving-gears, which cannot well be shown in the drawings. From the fourth pair of rolls the plastic sheet now passes into the fire-finisher. Here the glass comes into contact with the flame and the heat reflected from the highly-heated walls of the inside of the chamber. The effect is to give a brilliant and highly-polished surface, so much admired in the more expensive qualities of window-glass. The sheet is at the same time stretched above the last pair of rolls, which operation aids in smoothing out every vestige of surface irregularities which might impair the finish. The plastic sheet being now finished as to the thickness and quality of surface, lastly enters the air-cooling device, where it receives upon both sides regulated blasts of cool air which cool and set the glass into a rigid sheet. The sheet continues to be elevated until the last portion has passed through the various operations, when the machinery is stopped by turning the valve-handles of the pneumatic switchboard or such of them as may be necessary. The hanging sheet is then transferred at pleasure with its clamp by suitable mechanism to a place where it can be cut into lengths suitable for the annealing-oven, whence it is lastly transferred and cut up into sizes suitable for commercial purposes. The machine can be so arranged as to relative speeds of the different rolls as to merely roll and compress the glass sheet to a given thickness, leaving the stretching operation to be performed above the fourth pair of rolls by the action of the traction mechanism; but in practice I prefer the differential speeds above detailed in which the rolls themselves coöperate in the stretching at suitable points. The stretching between the rolling and compressing operations rearranges the molecules of the glass and assists in attaining the best finish upon the surface. The glass having now been removed from the machine a new clamp is inserted in the traction-cables and the clamps and cables are ready for the return movement. The clamp is preferably prepared by having a glass seal attached to the contacting portions of the metal, as this gives it a firmer and closer adhesion to the semiplastic terminal, and in some cases this would be almost wholly relied on and the terminal could be made of the simplest form without holes, grooves, or projections. The clamp may also have spurs or projections on its grasping portions, which will embed themselves in the plastic terminal and secure a firm grip when the glass is not entirely hard.

I claim and desire to secure by Letters Patent—

1. In a glass-working machine, a receptacle for hot plastic glass, an aperture therein through which a portion of the plastic glass exudes, means for forming a chilled terminal on said exuding portion, means for firmly grasping said chilled terminal, and traction means for positively drawing the plastic glass from the receptacle in a continuous stream following said chilled terminal, substantially as specified.

2. In a glass-working machine, a receptacle for hot plastic glass, a winding-shaft and drums above said receptacle, cords on said drums, connecting devices on said cords for making connection with a clamping device, traction-cords at the other side of said connecting devices, winding-drums to which said traction-cords are attached, and means for operating said winding-drums, substantially as specified.

3. In a glass-working machine, a framework, an air-cooling device suspended therein, said cooling device consisting of a double series of horizontal perforated air-pipes, main air-ducts for supplying air to said pipes, and movable regulating-shields applied to each pipe, for covering and uncovering the perforations therein, with means for operating said shields, substantially as specified.

4. In a glass-working machine, a revoluble roll mounted in pedestals sliding on ways, in combination with means for moving said roll and pedestals, consisting of levers 99 pivoted to said pedestals, knee-joints 101, levers 107, turnbuckles 102, lock-nuts 106, fulcrum-shaft 108, lever-arm 112, pneumatic cylinder and piston 41, and means for operating said pneumatic cylinder and piston, substantially as specified.

5. In a glass-working machine, in combination, a means for compressing or forming plastic glass into a sheet, means for continuously drawing and stretching said sheet against resistance, a pair of flat planes in the path of the plastic sheet, means for applying said planes to the surface of the moving sheet, and means for simultaneously reciprocating said planes across the moving sheet while applied thereto, substantially as specified.

6. In a glass-working machine, in combination, a means for compressing or forming plastic glass into a sheet, means for continuously drawing and stretching said sheet against resistance, a pair of flat hollow planes in the path of the plastic sheet, means for applying said planes to the surface of the moving sheet, means for simultaneously reciprocating the said planes across the moving sheet while applied thereto, and means for sending a fluid circulation through said hollow planes while operating, substantially as specified.

7. In a glass-working machine, in combination, a means for compressing or forming plastic glass into a sheet, means for continuously drawing and stretching said sheet against resistance, a pair of rolls for additionally compressing, drawing and stretching said plastic sheet, and means for reciprocating said rolls across the moving sheet while applied thereto, to polish the same, substantially as specified.

8. In a glass-working machine, in combination, a hopper for plastic glass, a pair of rolls near the outlet of said hopper, one roll fixed and having its circumferential surface in alinement with said outlet, the other roll journaled on pedestals movable toward and from the fixed roll on slideways, a pair of knee-jointed levers pivoted to said pedestals and to the fixed framework, and pneumatic means for operating said levers, whereby the rolls are approximated with power to compress the plastic glass into a sheet as it issues from the hopper, substantially as specified.

9. In a glass-working machine, in combination, a hopper for plastic glass, a pair of rolls for compressing the plastic glass into a sheet, a second pair of rolls for drawing and additionally compressing said plastic sheet, and means for simultaneously reciprocating said second pair of rolls while in contact with the glass surface, to polish the same, substantially as specified.

10. In a glass-working machine, in combination, a hopper for plastic glass, means for compressing said plastic glass into a continuous sheet as it issues from the hopper, means for drawing and stretching said sheet, a pair of rolls for additionally compressing and stretching said sheet, means for simultaneously reciprocating said rolls while operating on said sheet, to polish the same, and a reheating device beyond said pair of rolls, in the path of the plastic sheet, substantially as specified.

11. In a glass-working machine, in combination, a hopper for plastic glass, a means for compressing said plastic glass into a continuous sheet, means for rolling and simultaneously polishing said sheet, a reheating device, additional rolling, compressing and polishing means, and an adjustable clamp for positively grasping and drawing the plastic sheet by its extremity through the several rolling, compressing and polishing agencies, substantially as specified.

12. In a glass-working machine, in combination, a hopper for plastic glass, means for compressing said plastic glass into a continuous sheet, means for rolling, stretching and simultaneously polishing the plastic sheet by frictional application, means for independently drawing the plastic sheet by its extremity through the several rolling, compressing and polishing agencies, and a fire-finishing chamber, in the path of the plastic sheet, for finishing the surface of said sheet by means of flame impinged thereon, substantially as specified.

13. In a glass-working machine, in combination, means for forming, compressing, stretching and mechanically polishing a continuous sheet of plastic glass, means for positively drawing said sheet by its extremity through the several compressing and polishing agencies, a fire-finishing chamber, and means for cooling and setting the plastic sheet by blowing regulated currents of air upon its surface, substantially as specified.

14. In a glass-working machine, a frame composed of uprights, and cross-beams joining and combining said uprights, a prime-motor shaft, carrying suitable gears, affixed to the base of the machine, a series of horizontal shafting in the base of the machine carrying gears deriving motion from the prime-motor shaft, a series of frictional clutches on some of said horizontal shafts, for throwing them into and out of gear with the prime-motor shaft, and a series of pneumatic cylinders and pistons connected with said clutches, operated from a common pneumatic switchboard by a series of pneumatic valves, substantially as specified.

15. In a glass-working machine, a pair of rolls, one fixed, and the other journaled in pedestal-bearings horizontally movable toward and from the fixed roll on sliding ways, knee-joint levers for moving said movable pedestals, pivoted respectively thereto and fulcrumed on a common shaft on the main frame, extension adjustment means in said levers for adjusting the throw of the same, and pneumatic means for operating said levers and rolls, substantially as specified.

16. In a glass-working machine, a pair of hollow rolls, one fixed and the other journaled in pedestal-bearings horizontally movable toward and from the fixed roll on sliding ways, means for rotating said rolls in unison, means for circulating a cooling fluid through said rolls while rotating, means for reciprocating the rolls longitudinally while rotating, and pneumatic means for approximating and separating the rolls while rotating and reciprocating, substantially as specified.

17. In a glass-working machine, a pair of hollow pressure bars or planes, one fixed and the other non-revolubly journaled in pedestal-bearings horizontally movable toward and from the fixed plane on sliding ways, means for circulating a cooling fluid through said planes, means for reciprocating said planes longitudinally in opposite directions, and pneumatic means for approximating and separating said planes while reciprocating, substantially as specified.

18. In a glass-working machine, a pair of hollow pressure bars or planes, non-revolubly mounted in pedestal-bearings on shafts capable of longitudinal motion in said bearings, rotatory shafts mounted in said pedestals beneath said planes, means for rotating said rotatory shafts, and oblique disk cams on said shafts, engaging by their edges with guide-rolls 138 on the shafts of said planes, whereby the latter are caused to have reciprocatory motions in the line of their respective shafts, substantially as specified.

19. In a glass-working machine, in combination, means for forming plastic glass into a continuous sheet, means for drawing and stretching said continuous sheet by traction applied to its outer extremity, means for simultaneously rolling, compressing, and polishing said sheet, means for separately polishing said sheet by friction transversely applied, means for fire-finishing the surface of said sheet by jets of flame impinged upon the surface, and means for finally cooling and setting the plastic sheet by regulated jets of air impinged upon its surface, substantially as specified.

20. In a glass-working machine, an air-cooler consisting of a double series of horizontal pipes vertically arranged on each side of the path of the glass sheet to be cooled, said pipes perforated on the sides facing each other, main air-ducts with regulating-valves therein communicating therewith, and each horizontal pipe furnished with a movable shield, whereby the air from that tube can be separately cut off or applied, substantially as specified.

21. In a glass-working machine, the combination with a hopper for plastic glass, hollow mold-sections located at the bottom of said hopper, mounted in sliding ways, a flexible communication between the interiors of said sliding mold-sections, and pneumatic means for moving said sections on said ways, substantially as specified.

22. In a glass-working machine, a hopper for plastic glass, having a removable side 159, parallel horizontal ways beneath said hopper, movable hollow mold-sections sliding in said horizontal ways, means for circulating a cooling fluid through said hollow mold-sections, pneumatic cylinders and pistons connected with said mold-sections, and means for operating said pistons and mold-sections from a common pneumatic switchboard, substantially as specified.

23. In a glass-working machine, a hopper for plastic glass, movable mold-sections at the bottom of the said hopper, means for chilling said mold-sections, and means for separating said mold-sections, thereby leaving a chilled terminal of solidified glass adhering to the plastic glass in the hopper, whereby the latter can, by suitable appliances, be positively drawn in a continuous coherent stream from said hopper, substantially as specified.

24. In a glass-working machine, a clamping device, consisting of two pairs of curved grippers 177, 177, pivoted on a rod 196, links 178, and rod 180, with means at the extremities of rod 180 for connection with running traction-ropes 179, substantially as specified.

25. In a glass-working machine, a hopper for plastic glass, means for forming a chilled terminal on a protruding portion of said plastic glass, a rotary shaft with winding-drums thereon, mounted above said hopper, cords on said winding-drums, means for rotating said drums, and connecting-eyes 193, attached to said cords, for forming connection with a clamping device, substantially as specified.

26. In a glass-working machine, a rotary shaft in adjustable bearings, a roll on said shaft, a sprocket-wheel and elongated hub loosely mounted on said shaft, said hub splined on said shaft, groove 147 and ridge 146 on the hub and bearing respectively, preventing the hub from longitudinal movement while free to rotate, in combination with a disk cam on the other end of the shaft, and guide-rolls engaging the edge of the disk cam, whereby a combined rotary and reciprocating movement is imparted to the roll, substantially as specified.

27. In a glass-working machine, in combination, a rotary roll-shaft, pedestal-bearings for said shaft, an inclined disk cam on the end of said shaft, guide-rolls on the pedestal, engaging the edge of the disk cam, and means for adjusting the spacing of the said guide-rolls, substantially as specified.

28. In a glass-working machine, a rotary roll-shaft mounted in pedestal-bearings, an inclined disk cam on the end of said shaft, a pair of guide-rolls embracing the edge of said disk cam secured on the pedestal by studs 139, one of said studs moving in a slotted way for adjustment purposes, and a set-screw 105, for adjusting the guide-roll, substantially as specified.

29. In a glass-working machine, a four-way air-valve having inlet-passage 114, air-chamber 115, conduit-pipes 119, 120, air-passages 122, 123, between said air-chamber and said conduit-pipes, exit-passages 121, 124, from said conduit-pipes to the external air, and rotary spindle 125, having transverse passages 127, 128, registering with air-passages 122, 123, and passages 126, 129, at right angles to said passages 127, 128, and to each other, registering with exit-passages 121, 124, alternately, according to the angular positions of said rotary spindle, ninety degrees apart, substantially as specified.

30. In a glass-working machine, the combination, with a series of operative rolls, pressure-bars, and a terminal molding device, with pneumatic cylinders and pistons for controlling the various rotary, compressive and reciprocatory operations of said agencies, of a pneumatic switchboard, consisting of a series of valves, connected by tubing with the said various operative agencies in the machine, and hand-levers for controlling and operating said valves, substantially as specified.

In testimony whereof I affix my signature in presence of two witnesses.

IRVING W. COLBURN.

Witnesses:
GEO. F. HOFFMAN,
JAMES F. HAGEN.